(No Model.) 2 Sheets—Sheet 1.
C. F. SHEDD.
STALL.
No. 320,711. Patented June 23, 1885.
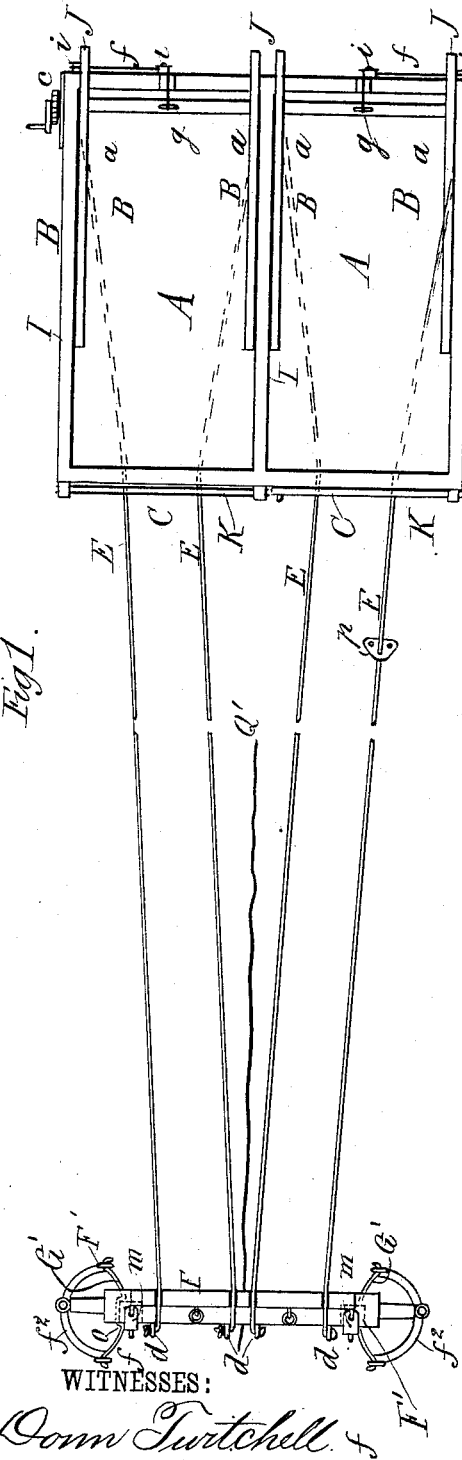
Fig 1.
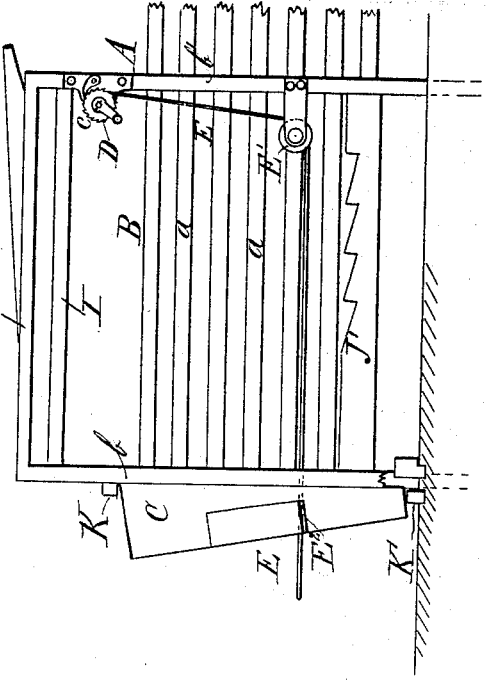
Fig. 2.
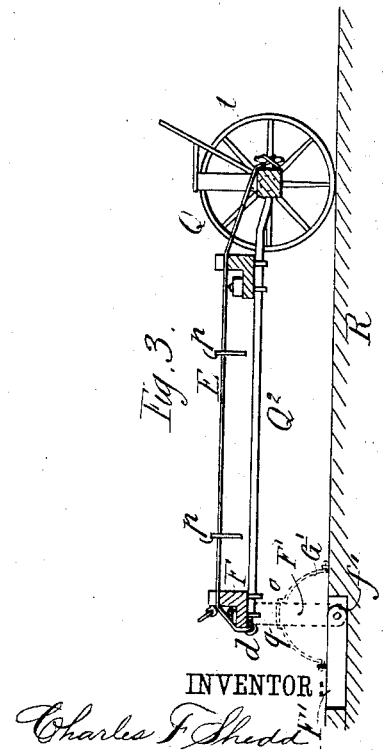
Fig. 3.
WITNESSES:
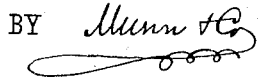
INVENTOR:
Charles F. Shedd
BY Munn & Co.
ATTORNEYS.

(No Model.) 2 Sheets—Sheet 2.

C. F. SHEDD.
STALL.

No. 320,711. Patented June 23, 1885.

WITNESSES:
Donn Twitchell
Chas. Lurcott

INVENTOR:
Charles F. Shedd
BY Munn & Co
ATTORNEYS.

UNITED STATES PATENT OFFICE.

CHARLES F. SHEDD, OF FAIRFIELD, NEBRASKA.

STALL.

SPECIFICATION forming part of Letters Patent No. 320,711, dated June 23, 1885.

Application filed September 24, 1884. (No model.)

*To all whom it may concern:*

Be it known that I, CHARLES F. SHEDD, of Fairfield, in the county of Clay and State of Nebraska, have invented a new and useful Improvement in Stalls, of which the following is full, clear, and exact description.

This invention relates to a stall for harnessing vicious horses and for yoking wild and vicious cattle preparatory to breaking the horses and cattle.

The invention consists of the construction, arrangement, and combination of parts, all as hereinafter described and claimed.

Reference is to be had to the accompanying drawings, forming part of this specification, in which similar letters of reference indicate corresponding parts in all the figures.

Figure 4:
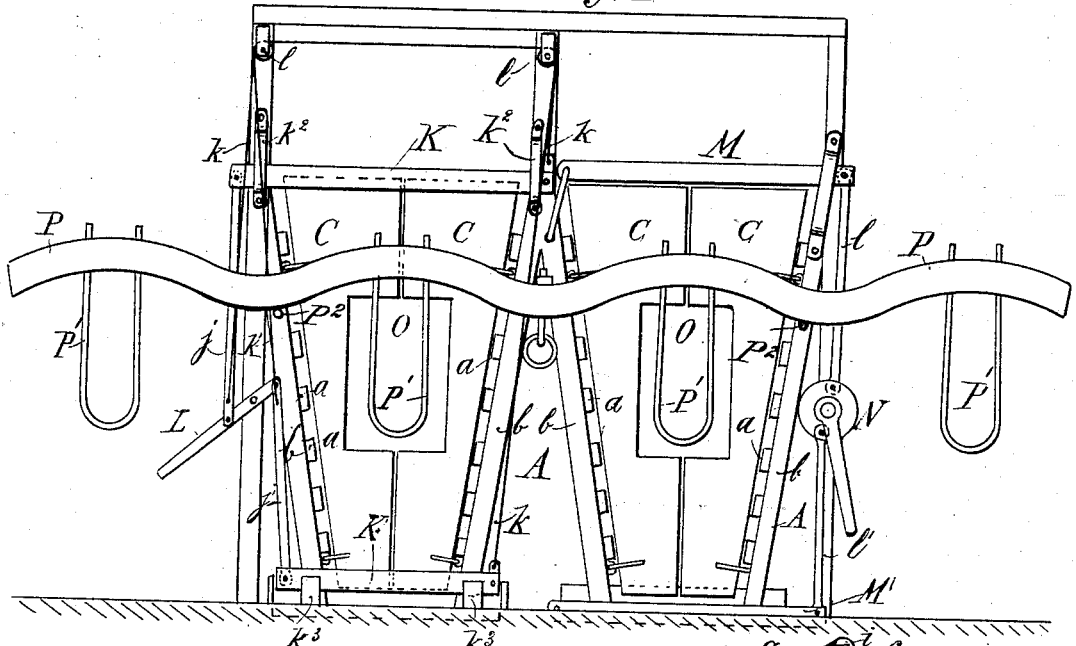
Figure 5:
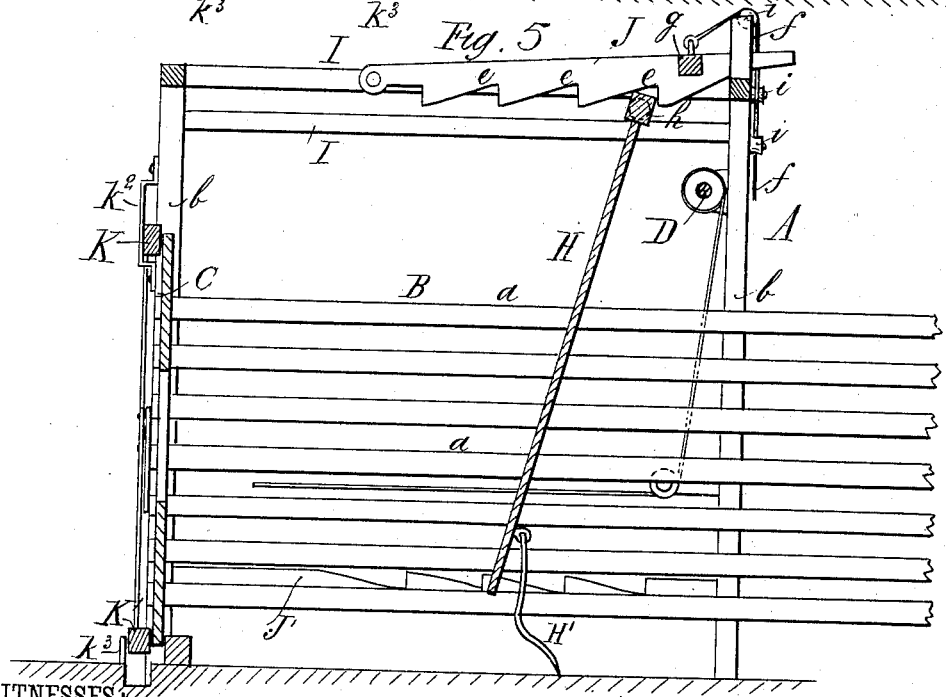

Figure 1 is a plan view of my invention, showing two stalls made together, and showing the leading ropes or cables attached to the neck-yoke. Fig. 2 is a side elevation of the stalls, showing the front doors of the stalls open. Fig. 3 is a sectional elevation of the vehicle and neck-yoke and ropes. Fig. 4 is a front elevation of the stalls, showing a double ox-yoke in place at the front of the stalls to be placed upon the necks of the oxen. Fig. 5 is a sectional elevation of one of the stalls.

A A represent the stalls. These may be made singly, but I prefer to construct them in pairs, so that two horses or cattle can be handled at the same time. The side walls, B B, of the stalls are composed of the slats $a\ a$, secured to the diverging front and rear posts $b\ b$, so that the walls B B are inclined away from each other, each forming a stall that is narrow at the bottom and of considerable width at the top. At the front the stalls are closed by the doors C C.

To the rear posts $b\ b$, near the upper ends, is journaled in suitable boxes the crank-shaft D, to which the rear ends of the ropes or cables E E are attached, so that by turning this shaft the ropes may be wound upon or unwound from the said shaft.

Pawl-and-ratchet attachments $c\ c$ are attached to the shaft D and stalls to prevent the shaft D from turning back when the ropes are wound upon it. From the shaft D the ropes E pass down under the pulleys E', thence out through slots E², made through the doors C, thence to the neck-yoke F, where they are made fast to suitable eye-bolts $d$.

The neck-yoke is held firmly by suitable means hereinafter described, and after the ropes have been attached to the eye-bolts $d$ the ropes must be drawn taut by turning the shaft D.

H is the rear door of the stalls. (Shown clearly in Fig. 5.) This is suspended by the bar $h$, the ends of which run between the parallel bars I I, which permit the door H to be moved backward or forward in the stall, so that after the animal is placed in the stall he can be shoved forward by the door H and held from backing. For holding the door H at the bottom I provide it with the hinged bar or follower H', that is adapted to enter the bottom of the stall, as shown in Fig. 5, and for holding the door H at its upper end I pivot to the upper bars I the bars J, having notches $e\ e$, that are adapted to catch over the bar $h$, as illustrated in Fig. 5.

The free ends of the notched bars J may be raised for disengaging the notches $e$ from the bars $h$ by pulling downward upon the cords $f$, which are attached to the cross-piece $g$ and pass thence over the pulleys $i\ i$, as shown clearly in Figs. 1 and 5.

A notched piece, J', is attached to the lower part of the stall, or both sides thereof, so that in case the bar H' should fail to hold the lower end of the door H a bar may be passed across the stall back of the door H, and placed in corresponding notches of the bars J', and in that manner firmly hold the lower end of the door H from swinging backward.

The front door, C, may be held closed by any suitable means; but I prefer to employ the upper cross-piece, K, and lower cross-piece, K', which cross-pieces are attached at their outer ends to the lever L, on opposite sides of its fulcrum by the straps of iron or wood $j\ j'$, and at their inner ends to this lever L, also on opposite sides of the fulcrum, by the cords $k\ k'$, which pass up over pulleys $l\ l$, thence down to the said lever L, so that by operating the lever L both bars K K' will be moved both to and from each other (according to the movement of the lever) simultaneously and at both ends equally, so as to lock and release the doors C C at both the upper and lower ends at the same time. The upper bar, K, is held in place by the cleat $k^2$, and the lower bar, K', by the plates $k^3$, (shown clearly in Figs. 4 and 5.)

Instead of using the bars K K', and the means just described for operating them for holding the doors C C closed, the bars M M' may be used for that purpose, which bars are pivoted at their inner ends to the stall, and attached at their outer ends to the double eccentric lever N by the rods $l\ l'$, so that by operating the lever N the outer ends of the bars M M' may be simultaneously drawn toward each other for locking the doors, or simultaneously moved away from each other for unlocking the said doors C.

When cattle are to be handled, the doors C C, instead of being slotted, as shown at $E^2$, Fig. 2, will have the large openings O made in them, as shown in Fig. 5, through which the oxen may be forced, by door H, to put their heads so that the double yoke P, supported upon pins $P^2\ P^2$ in posts $b$, may be placed upon them and held by bows P'; and in handling oxen neither the neck-yoke F or vehicle Q will be used, it being designed when double stalls are used to yoke two wild cattle with two well-broken oxen, and break them in any manner desirable.

When horses are to be handled, the neck-yoke F will first be placed upon the posts F' F', and secured to the straps $m\ m$, engaging with hooks or straps, or by other suitable means. The posts F' are hinged to the floor R, and they are preferably hinged in the recess $f'$, made in the floor, as shown in Fig. 3, and they are adapted to be held in vertical position by the bails G' hinged to the floor, which bails are bent, as shown at O, to clasp the posts F', so as to hold them firmly in vertical position; and curved recesses $f^2$ are also cut in the floor to receive the bails G' when tipped back, so that when so tipped back they will stand flush with or below the upper surface of the floor R, and not obstruct the vehicle Q in being drawn over the floor, and the posts F' drop into the recesses $f'$ for a like purpose.

The neck-yoke F being attached and secured to the posts F', the ropes E will be attached to the neck-yoke and drawn taut by turning the shaft D. Then the doors C will be closed and locked, and the horses run into the stalls A A, and the door H closed behind them, and harnessed, and suitable parts of the harness will be attached to the sliding leathers $p\ p$, placed upon the rope E. The doors C will now be opened, and the horses lead out of the stalls along the ropes E to the neck-yoke F, to which they will be attached alongside of two well-trained horses. The vehicle Q will now be brought between the horses and the stalls A A, and drawn forward by the rope Q', so that the tongue $Q^2$ of the vehicle may be placed in the ring of the neck-yoke. Then the horses will be attached to the whiffletrees of the vehicle, and then the ropes E will be detached from the shaft D and attached to the cleats $t$ of the vehicle. This done the neck-yoke F will be disconnected from the posts F' and the posts F' and the bail G' turned down into their respective recesses $f'\ f^2$, and the four-horse team started. The wild horses being harnessed to the rope E, it follows that they cannot kick, rear, plunge, or throw themselves, so that in this manner they may be very soon brought to subjection and trained, and this entirely without danger of injury to the horses or to the person or persons handling them.

Having thus described my invention, what I claim as new, and desire to secure by Letters Patent, is—

1. A harnessing-stall having the horizontally-swinging doors at its front end provided with slots $E^2$, for the purpose set forth, a forwardly-adjustable rear door suspended at its upper end by pivots mounted between the top side rails of said stall, and means for locking the forward doors and also the rear door in its several positions, substantially as set forth.

2. The combination, with the harnessing-stall having slotted doors C and a rear door, of the crank-shaft D, ropes E, and yoke F, substantially as described.

3. The harnessing-stall provided with the swinging and sliding door H, in combination with the notched rods J, for holding the top of the gate, and means, substantially as described, for holding the lower end of the gate, substantially as set forth.

4. The gate H, held to the stall by bar $h$, and adapted to swing and slide, and provided with the follower H' at its lower end, in combination with the notched bars J, substantially as and for the purposes set forth.

5. The stall A, provided with the doors C, and with bars for holding the doors at top and bottom, in combination with means, substantially as described, for operating the holding bars simultaneously, as set forth.

6. The combination, with the stall A and door C, of the bars K K' and lever L, the ends of the bars K K' being attached to the lever on opposite sides of its fulcrum by the plates $j\ j'$ and cords $k\ k'$, passing over suitable pulleys $l$, substantially as described.

7. The neck-yoke F, held by hinged posts F', and bail G', in combination with the stalls A, leading-ropes E, and winding-shaft D, substantially as described.

CHARLES F. SHEDD.

Witnesses:
IRA TITUS,
C. B. TRACY.